US012680424B2

(12) United States Patent
Mørck et al.

(10) Patent No.: US 12,680,424 B2
(45) Date of Patent: Jul. 14, 2026

(54) SYSTEMS AND METHODS FOR SUBSEA FLUID HANDLING

(71) Applicant: OneSubsea AS, Oslo (NO)

(72) Inventors: Morten Rengman Mørck, Oslo (NO); Martin Pedersen, Oslo (NO); Franco Attolini Smithers, Oslo (NO)

(73) Assignee: OneSubsea AS, Oslo (NO)

( * ) Notice: Subject to any disclaimer, the term of this patent is extended or adjusted under 35 U.S.C. 154(b) by 0 days.

(21) Appl. No.: 18/879,372

(22) PCT Filed: Jun. 23, 2023

(86) PCT No.: PCT/NO2023/060000
§ 371 (c)(1),
(2) Date: Dec. 27, 2024

(87) PCT Pub. No.: WO2024/005647
PCT Pub. Date: Jan. 4, 2024

(65) Prior Publication Data
US 2025/0389172 A1 Dec. 25, 2025

(30) Foreign Application Priority Data

Jun. 29, 2022 (GB) .................................... 2209519

(51) Int. Cl.
*F16L 55/00* (2006.01)
*E21B 17/02* (2006.01)
(Continued)

(52) U.S. Cl.
CPC .......... *E21B 43/0107* (2013.01); *E21B 17/02* (2013.01); *E21B 34/00* (2013.01);
(Continued)

(58) Field of Classification Search
CPC ........ E21B 43/107; E21B 17/02; E21B 34/00; E21B 41/0007; E21B 34/063; F16K 17/40; F16L 55/00
(Continued)

(56) References Cited

U.S. PATENT DOCUMENTS 5,165,439 A * 11/1992 Krynicki ................. F16K 17/40
137/39
6,024,514 A 2/2000 Ostergaard
(Continued)

FOREIGN PATENT DOCUMENTS

AU 2015201520 A1 10/2015
GB 2555120 A 4/2018
(Continued)

*Primary Examiner* — Matthew R Buck
*Assistant Examiner* — Douglas S Wood
(74) *Attorney, Agent, or Firm* — Kyle R. Miiller

(57) ABSTRACT

A method of establishing a fluid connection in a subsea petroleum production system, the method comprising: positioning a first subsea fluid handling component (4,11-17,28) having a first connector (4a, 11a, 12a, 12b,29) adjacent a second subsea fluid handling component (4,11-17,28) having a second connector (4a, 11a, 12a, 12b,29), the first and/or second connectors (4a, 11a, 12a, 12b,29) having a breakable plug (20) sealingly arranged therein; operating an actuator to make up a connection between the first and second connectors (4a, 11a, 12a, 12b,29) while the breakable plug (20) is intact; shattering the plug (20) such as to open for fluid connection between the first and second subsea fluid handling components (4,11-17,28). There is also provided a subsea pipe (11,12,13) for arrangement on a sea floor (2) or on a subsea structure (4,14-17), having a breakable plug (20) sealingly arranged in an end connector (11a,12a, 12b) forming strengthened end parts of the pipe (11,12,13).

8 Claims, 8 Drawing Sheets

(51) Int. Cl.
  *E21B 34/00*        (2006.01)
  *E21B 41/00*        (2006.01)
  *E21B 43/01*        (2006.01)
  *F16K 17/40*        (2006.01)
(52) U.S. Cl.
  CPC .......... *E21B 41/0007* (2013.01); *F16K 17/40*
      (2013.01); *F16L 55/00* (2013.01)
(58) Field of Classification Search
  USPC ......................................................... 166/344
  See application file for complete search history.

(56)                   References Cited

U.S. PATENT DOCUMENTS

| | | | |
|---|---|---|---|
| 9,080,699 B2 | 7/2015 | Larsson | |
| 11,680,462 B2 * | 6/2023 | Tunes ..................... | E21B 33/12 |
| | | | 166/317 |
| 11,739,606 B2 * | 8/2023 | Sherman ................. | E21B 29/02 |
| | | | 166/376 |

| | | | | |
|---|---|---|---|---|
| 2010/0120130 A1 * | 5/2010 | Srinivasan .......... | B01F 33/3021 |
| | | | 204/600 |
| 2013/0014933 A1 * | 1/2013 | Brandsdal ............... | E21B 47/10 |
| | | | 166/113 |
| 2014/0167424 A1 * | 6/2014 | Frias ..................... | E05C 19/163 |
| | | | 292/145 |
| 2016/0123094 A1 * | 5/2016 | Amezaga .............. | E21B 19/165 |
| | | | 166/380 |
| 2016/0251937 A1 * | 9/2016 | Fripp .................... | E21B 34/063 |
| | | | 166/373 |
| 2019/0203563 A1 * | 7/2019 | Gano ...................... | E21B 33/12 |
| 2021/0262322 A1 * | 8/2021 | Ellingsen ............. | E21B 43/013 |
| 2023/0340856 A1 * | 10/2023 | Soerheim ........... | E21B 33/1208 |

FOREIGN PATENT DOCUMENTS

| | | |
|---|---|---|
| GB | 2574586 A | 12/2019 |
| WO | 2009116871 A1 | 9/2009 |
| WO | 2020197413 A1 | 10/2020 |

* cited by examiner

SYSTEMS AND METHODS FOR SUBSEA FLUID HANDLING

The present disclosure relates to systems and methods for installing a subsea pipe and other fluid handling components in a subsea environment.

BACKGROUND

On subsea structures, for example manifold and valve structures which are deployed on the seabed, piping is often arranged thereon having one or more pipes that terminate in a connecting point. Each connecting point may include a connecting part on a subsea structure to which a pipe is to be connected. Such subsea structures and piping are commonly used for example in petroleum production systems, for transporting and handling petroleum products or other fluids. Other plants in which it may be necessary to install subsea pipes include offshore power generation plants.

Publications which may be useful for understanding the field of technology include U.S. Pat. No. 9,080,699 B2; GB 2574586 A; GB 2555120 A; and AU 2015201520 A1.

Installation of such structures or piping is technically complex and cost-intensive, and there is a need for technology which can contribute to efficient and safe installation of such equipment. The present disclosure has the objective to provide such improved technology, or at least useful alternatives to the state of the art.

SUMMARY

In an embodiment, there is provided a method of installing a subsea pipe, the method comprising: laying down a pipe onto a sea floor or onto a subsea structure, the pipe and/or the subsea structure having a breakable plug sealingly arranged in an internal flow line of the pipe and/or the subsea structure; positioning an end connector of the pipe adjacent a connector of a subsea structure; making up a connection between the end connector and the connector of the subsea structure while the breakable plug is intact; shattering the plug such as to open for fluid connection between the pipe and the subsea structure.

In an embodiment, there is provided a method of establishing a fluid connection in a subsea petroleum production system, the method comprising: positioning a first subsea fluid handling component having a first connector adjacent a second subsea fluid handling component having a second connector, the first and/or second connectors having a breakable plug sealingly arranged therein; operating an actuator to make up a connection between the first and second connectors while the breakable plug is intact; shattering the plug such as to open for fluid connection between the first and second subsea fluid handling components.

In an embodiment, there is provided a subsea pipe having a breakable plug sealingly arranged therein.

The detailed description below and appended claims outline further inventive aspects and embodiments.

BRIEF DESCRIPTION OF THE DRAWINGS

These and other characteristics will become clear from the following description of illustrative and non-restrictive examples, with reference to the attached drawings, in which.

DETAILED DESCRIPTION

Figure 1:
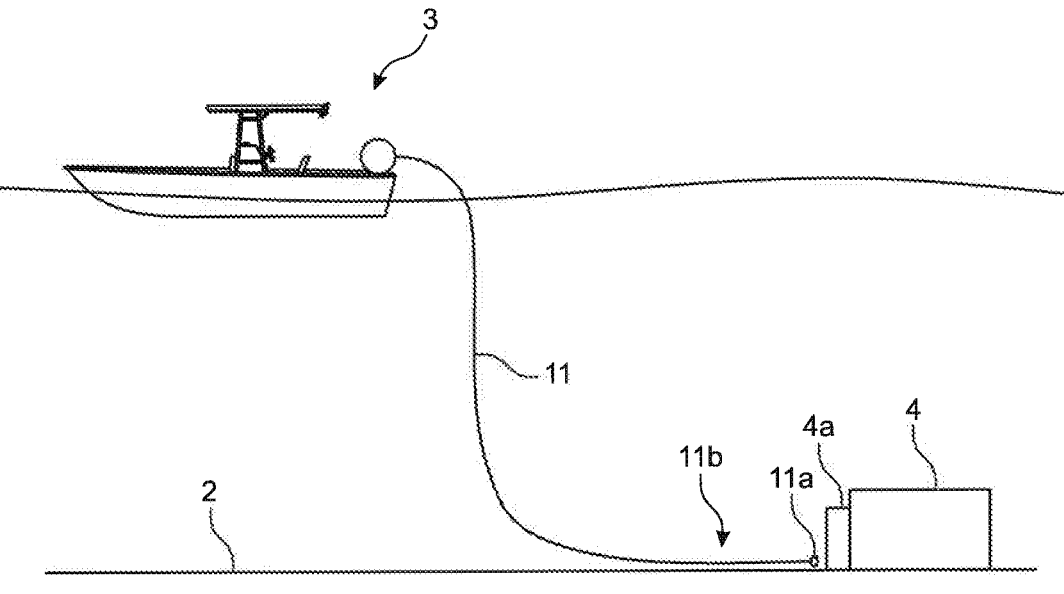
FIG. 1 illustrates the installation of a subsea pipe on a sea floor.

FIG. 1 illustrates a step in an installation process for a subsea pipe 11. The pipe 11 in this example is a flexible pipe which is installed to a sea floor 2 from a ship 3. The pipe 11 is installed by first positioning an end part 11b of the pipe 11 adjacent a subsea structure 4 to which the pipe 11 is to be connected, and then reeling out (or otherwise building/supplying) pipe 11 from the ship 3 so as to lower the pipe 11 into the sea as the ship 3 moves relative to the subsea structure 4. The pipe 11 may be laid to another subsea structure which is spaced from the subsea structure 4, or for example, to a fixed platform or a land-based location.

The pipe 11 has an end connector 11a, which is arranged for connection to a corresponding connector 4a on the subsea structure 4. The connectors 11a,4a may, for example, be a connector assembly similar to that described in the abovementioned U.S. Pat. No. 9,080,699 B2. The subsea structure 4 may, for example, be a component of a subsea processing or production system for handling petroleum products, and the pipe 11 may be a transport pipe for petroleum or for other fluids associated with the operation of the subsea processing/production system. The pipe 11 can in some examples be a flexible pipe which is laid out on the sea floor 2 to transport fluids to or from a location remote from the subsea structure 4, such as a location several hundred metres or more away from the subsea structure 4. Alternatively, as illustrated in FIG. 2, the pipe may be a so-called "jumper" pipe 12,13, which extends between two subsea structures 14-17 which are located in relative proximity to each other on the sea floor 2, such as less than 100 m apart.

Figure 2:
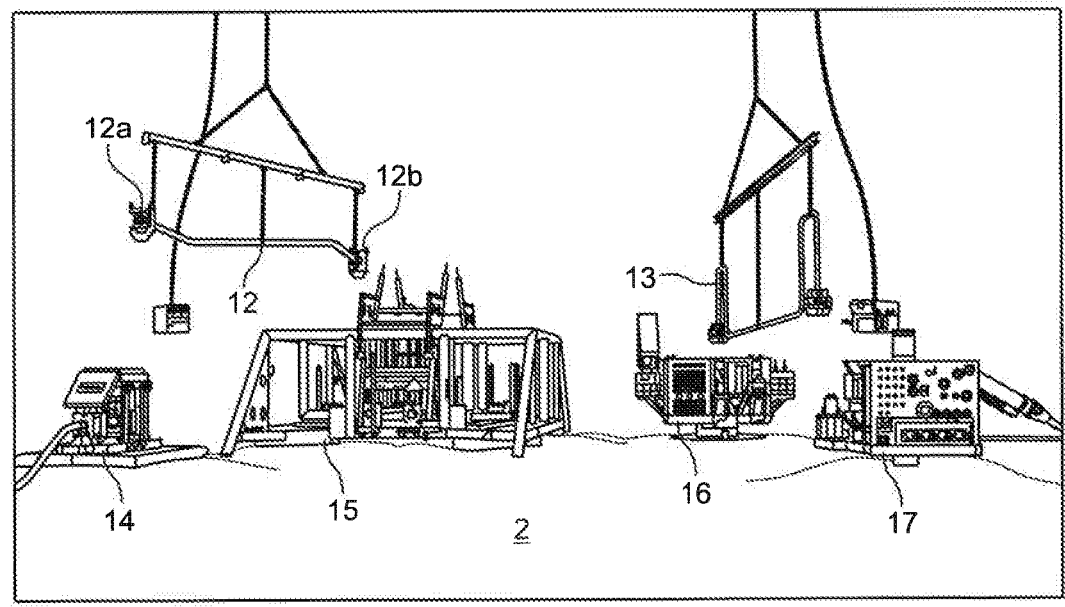
FIG. 2 illustrates the installation of subsea jumper pipes.

Illustrated in FIG. 2 is a jumper pipe 12 with horizontal connectors 12a,b at each end, to engage with corresponding connectors at subsea structures 14 and 15. On the right hand side of FIG. 2, a jumper pipe 13 having vertical connectors is illustrated, configured to be arranged between subsea structures 16 and 17. Jumper pipes 12, 13 are typically installed from a vessel by lowering the pipes 12, 13 via a lifting member (e.g. a wire or rope) until they are in the desired position relative to the relevant subsea structures 14-17.

Both in installation processes as illustrated in FIG. 1 and installation processes as illustrated in FIG. 2, it is common to first allow the pipe 11, 12, 13 with the connectors 11a, 12a, 12b to be positioned in place relative to the relevant subsea structures 14-17 and the connectors thereon, and then to operate an actuator to make up the connections. The actuator may in such a case pull in one connector part into engagement with another connector part, e.g. pull the connector 11a towards the connector 4a in FIG. 1, and then to lock the connectors together. In this process, the pipe 11 may also be partly moved (e.g., pulled) relative to the sea floor 2 and/or the subsea structure(s) 14-17.

According to an example, a method of installing a subsea pipe 11,12,13 can include laying down a pipe 11, 12, 13 onto a sea floor 2 or onto a subsea structure 4, with the pipe 11, 12, 13 having a breakable plug 20 sealingly arranged in an internal flow line of the pipe 11, 12, 13.

Figures 3, 4, 5:
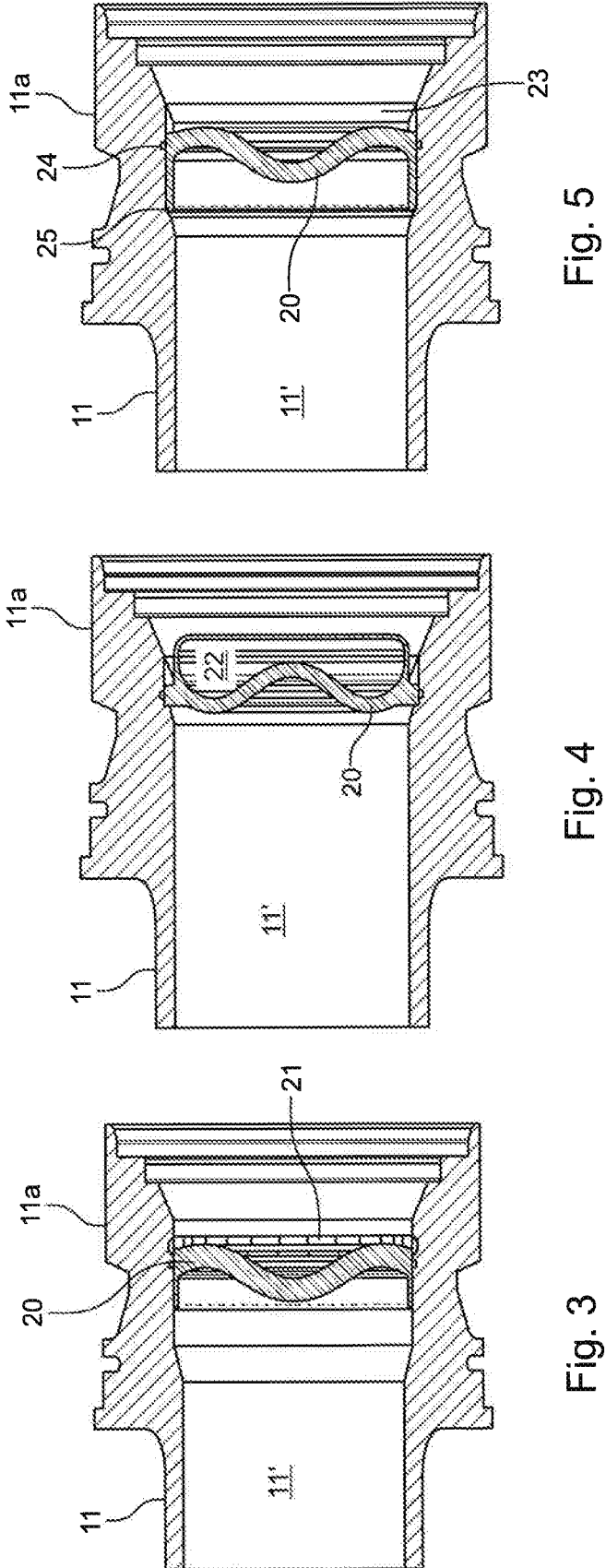
FIGS. 3-7 illustrate various examples of breakable plugs.

FIG. 3 illustrates a connector 11a having a breakable plug 20, in this example a glass plug. The plug 20 is arranged in the connector 11a, which makes up a strengthened part at the end of the pipe 11. The plug 20 is advantageously arranged in the connector 11a (i.e., in the strengthened part), but can optionally be arranged in the pipe 11. The pipe 11 has an internal volume forming the internal flow line 11' of the pipe 11. When the plug 20 is intact, it effects a closing and sealing of the pipe 11 at the connector 11a.

In the event that jumper pipes 12,13 are installed, as illustrated in FIG. 2, there may be a plug 20 at either end of the pipe 12, 13. This may, for example, be beneficial if it is desirable to keep the pipe(s) 12, 13 gas-filled during instal-lation.

When installing the pipe 11, 12, 13, one or both end connector(s) 11a, 12a, 12b of the pipe 11, 12, 13 is posi-tioned adjacent a connector (indicated at 4a in FIG. 1, not labelled in FIG. 2) of the subsea structure 4, 14-17. The connection between the end connector 11a, 12a, 12b and the connector 4a of the subsea structure 4, 14-17 can then be made up while the breakable plug 20 is intact.

Subsequent to making up the connection, the plug 20 can be shattered such as to open for fluid connection between the pipe 11, 12, 13 and the subsea structure 4, 14-17. The plug 20 can be shattered by increasing a pressure at the plug 20 so as to cause a shattering of the plug 20 by the plug 20 not being able to withstand the applied pressure and thereby breaking. This may be a pressure at a pipe 11 side of the plug 20 (i.e., increasing the pressure in the flow line 11' as illustrated in FIG. 3), or it may be a pressure at a connector side of the plug 20 (i.e. on the right hand side of the plug 20 as illustrated in FIG. 3, which is the side towards the connector 4a). The pressure increase can thus be effected from the vessel 3 via the pipe 11, or from the subsea structure 4. In the examples illustrated in FIG. 3, the plug 20 is configured for being shattered by increasing a pressure at the connector side, from the subsea structure 4.

Alternatively, the plug 20 may be shattered by other means, for example via an ROV 5 (remotely operated vehicle), for example by means of a screw pin or equivalent extending into the connector 11a and operable from the outside, such that the ROV can effect a load (advantageously a point load) onto the plug 20. FIGS. 15-18, described below, illustrate another example for shattering the plug 20. In any of the examples, the plug 20 may be shattered by means of mechanical damage by e.g. a point load which breaks the plug 20 directly, or which is sufficient to reduce the 10 structural integrity of the plug 20 to such a degree that the fluid pressure shatters the plug 20.

In an example such as that shown in FIG. 2, the plugs may be shattered by pressure from either side, for example both plug being shattered by pressure from their respective proxi-mate subsea structure, or the plugs may be shattered sequen-tially by applying a pressure from one side, i.e. from one of the subsea structures. Alternatively, the plugs may be shat-tered by other means, such as an ROV.

By installing the pipe 11,12,13 having one or more plugs 20 therein, one can avoid the need to have a cap or equivalent at pipe ends during positioning and installation of the pipe 11, 12, 13. This can obviate the need for removal of the cap(s) during the installation procedure. Additionally, or alternatively, the interior of the pipe 11, 12, 13 can be better protected by having a preservation fluid therein and held in place by the plug(s) 20 during the installation procedure. Yet additionally, or alternatively, the pipe 11, 12, 13 may com-prise a gaseous medium therein during the installation procedure, which may, for example, be advantageous in order to achieve a lower weight of the pipe 11, 12, 13 during the installation procedure. By using one or more plug(s) 20 in this manner, the preservation fluid or medium in the pipe 11, 12, 13 can be held in place until the pipe 11, 12, 13 is fully connected up to the subsea structure(s) 4, 14-17, and without a need to remove pipe caps for this purpose, e.g. with an ROV. This may, for example, prevent seawater ingress and a subsequent need for flushing the pipe system. The shattering of the plug(s) 20 may thus advantageously be done after the connections between the end connector(s) 11a, 12a, 12b and the connector(s) 4a of the subsea structure 4, 14-17 have engaged sufficiently to prevent water ingress.

In one example, subsequent to laying down the pipe 11, 12, 13 and prior to shattering the plug 20, the pipe 11, 12, 13 and/or the connections can be pressure tested by increasing an internal pressure of the pipe 11, 12, 13 with the breakable plug(s) 20 intact therein. For example, in the example shown in FIG. 1, it may be desirable to pressure test the pipe 11 after laying down the pipe 11 at the sea floor 2, and prior to making up the connection between connectors 11a and 4a. Such pressure testing can then be carried out from the ship 3, for example to identify any damage to the pipe 11 (e.g. due to excessive bending) during the lay-down process. This may be particularly relevant for a flexible pipe 11.

In an example such as that illustrated in FIG. 2, it may be desirable to pressure test the pipe 12, 13 and/or the connec-tions at one side after having made these up. This may, for example, be done by applying a fluid pressure from the subsea structure at one side, so as to increase the pressure at the plug 20 while the plug 20 is intact in the pipe 12, 13. In this manner, one or both connections towards the subsea structures 14-17 can be tested prior to shattering the plug(s) 20.

FIGS. 3-5 illustrate different designs of glass plugs 20. FIG. 3 illustrates a plug 20 held in place by a segmented lock ring 21. When the plug 20 shatters, the elements of the segmented lock ring 21 will become loose and can be carried away with the flow together with the shards from the plug 20.

FIG. 4 illustrates a plug 20 having an enclosed, internal fluid volume 22. The fluid volume 22 may, for example, be filled with a gaseous fluid and may assist in withstanding a pressure acting on the plug 20 prior to shattering, but permit shattering of the plug 20 when desired, for example from the structure side (i.e., the right hand side as viewed in FIG. 4).

FIG. 5 illustrates a plug 20 similar to that shown in FIG. 3 being held in place by a continuous lock ring 23, designed to remain in place in the end connector 11a after the plug 20 is shattered. In the illustrated examples of FIGS. 3-5, the lock ring is configured to hold the plug 20 in place while applying a pressure in the flow line 11', i.e. to prevent movement of the plug 20 out of the end connector 11a once inserted and fixed in place.

In all the examples, a seal 24 (indicated in FIG. 5 but visible also in FIGS. 3 and 4) may be used between the plug 20 and the surrounding structure, here the end connector 11a.

Illustrated in FIG. 5, the plug 20 may comprise an angled or frustoconical portion 25 to effect a build-up of tension in the plug 20 when pressure is applied from one side (in this case, from the right hand side). The angled or frustoconical portion 25 cooperates with a corresponding face in the surrounding structure, here in the end connector 11a. The corresponding face may, for example, be an angled shoulder in the end connector 11a. The plug 20 may thus be designed to allow movement towards the left-hand side when pressure is applied from the structure side (the right hand side as viewed in FIG. 5), generating increased material tensions in the plug 20 due to the interaction between the angled frustoconical portion 25 and the corresponding face, and eventually shattering the plug 20 when the applied pressure reaches a required threshold according to the chosen plug design and structural strength.

Figure 6:
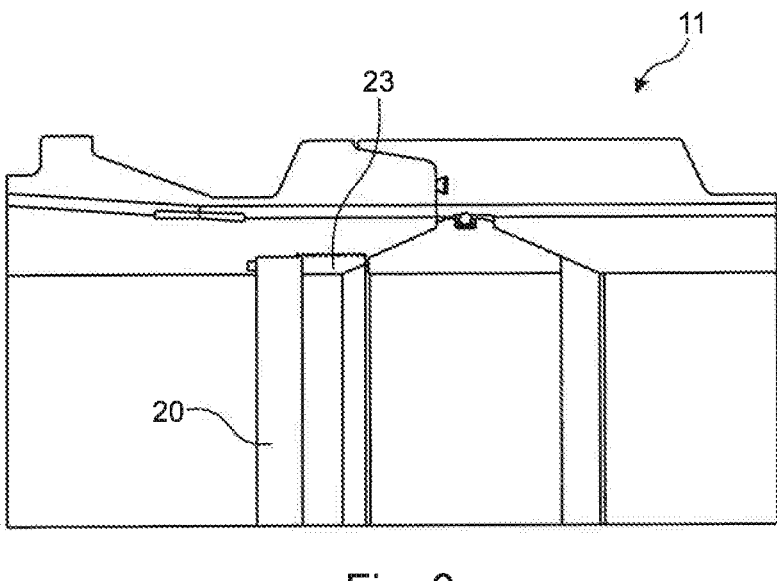
Figure 7:
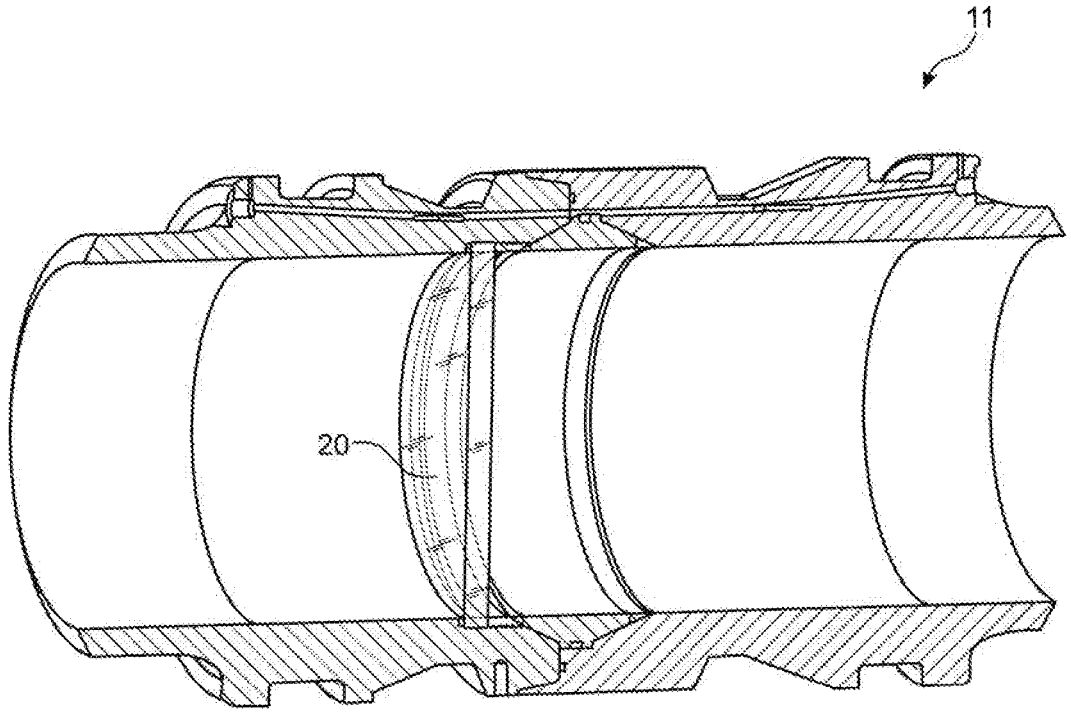

FIGS. 6 and 7 illustrate a plug 20 configured for installation in the pipe 11. The plug 20 is illustrated as a disc-shaped plug, however may alternatively have a design similar to one of the designs illustrated in FIGS. 3-5, or a different design.

Figure 8:
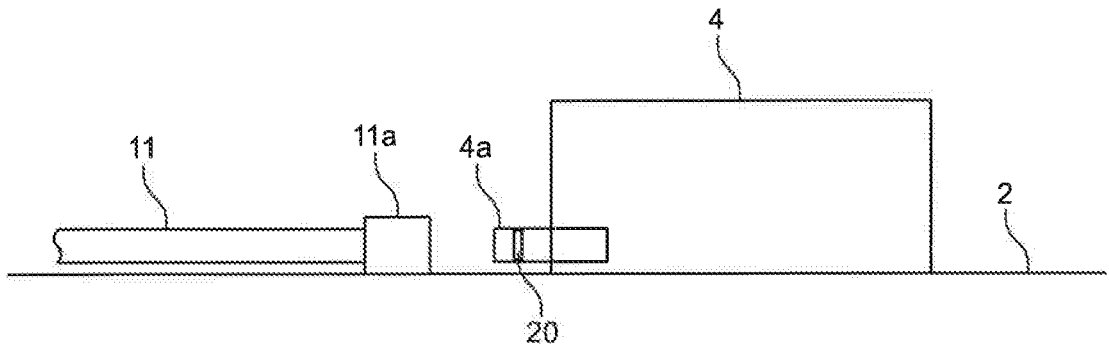
FIGS. 8 and 9 illustrate steps in the establishing of a fluid connection in a subsea petroleum production system.

FIG. 8 illustrates an example in which the plug 20 is arranged in the connector 4a of the subsea structure 4, i.e. in the pipe part of the subsea structure 4 to which the pipe 11 is to be connected. The plug 20 may in such an example alternatively be arranged in a fluid line inside the subsea structure, i.e. behind the connector 4a. This arrangement can, for example, be useful to avoid sea water ingress into valves or other components inside the subsea structure 4 prior to connection of the pipe 11. The subsea structure 4 can, for example, be installed with the plug 20 and a preservation fluid in the internal piping so as to avoid corrosion or other degradation mechanisms prior to hook-up of the pipe 11. In an advantageous example, both the subsea structure 4 and the pipe 11 are provided with plugs 20.

Figure 9:
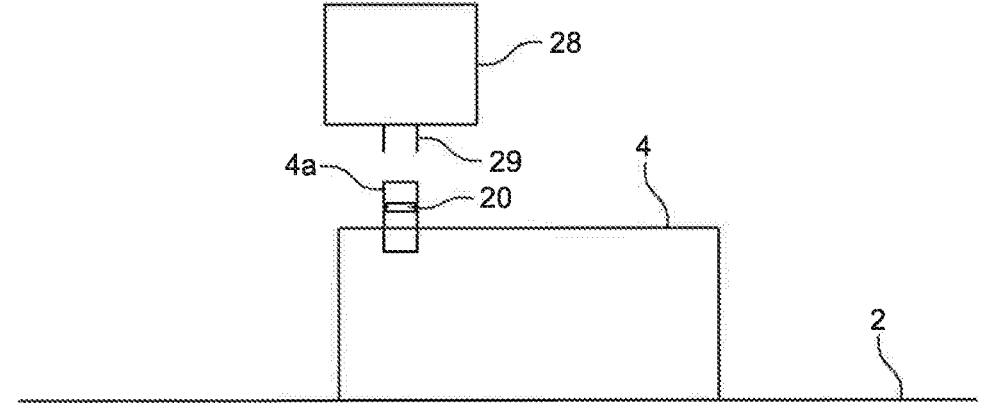
Figure 10:
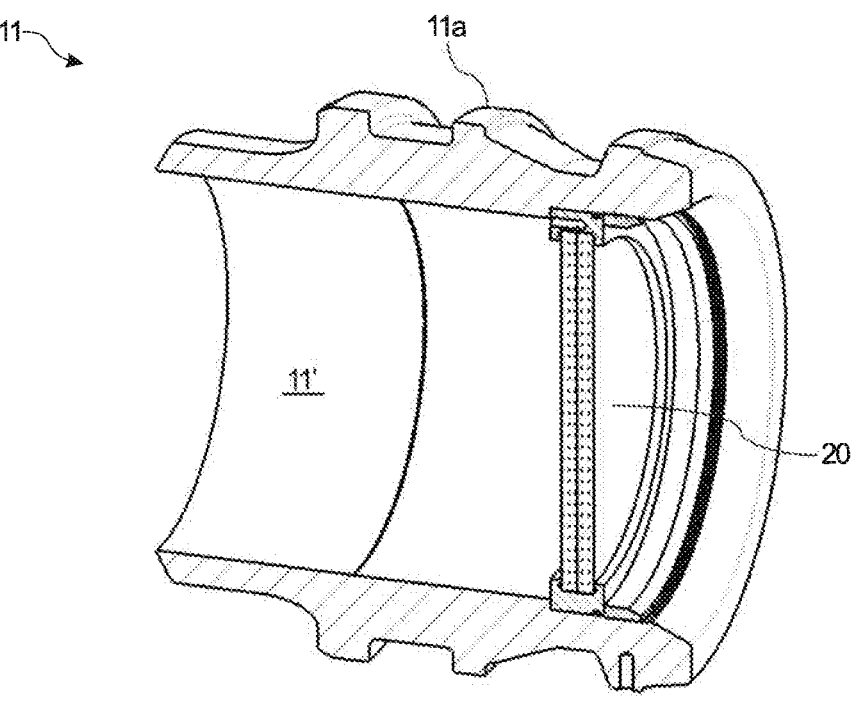
FIGS. 10-14 illustrate an example having a fluid channel to an interior volume of a breakable plug having two parts.
Figure 11:
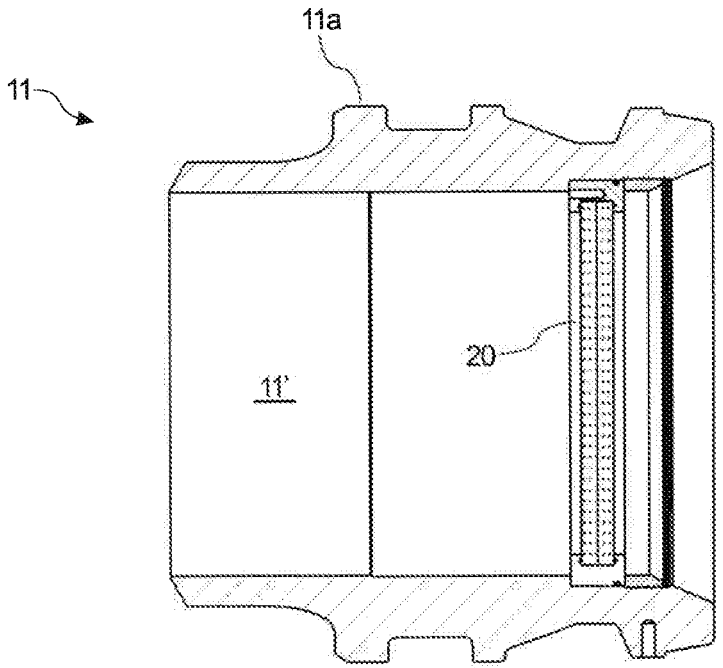
Figure 12:
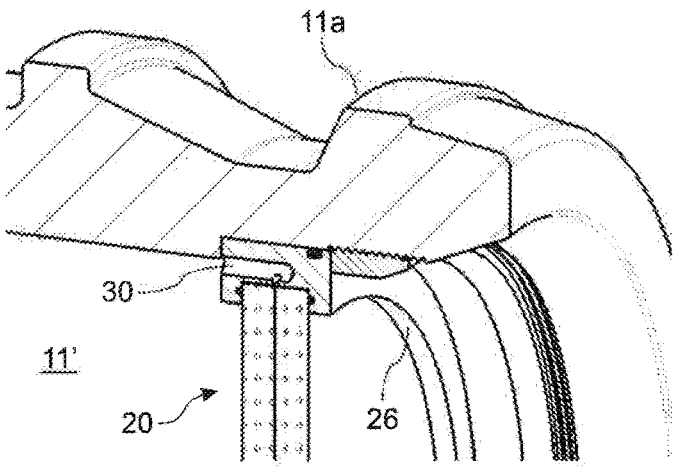

FIG. 9 illustrates another example wherein a connector 4a of a subsea structure 4 is configured to connect to another structural part 28 having a connector 29. The structural part 28 may, for example, be a fluid processing unit configured to exchange fluid with the subsea structure 4 or make up an intermediate component between the subsea structure 4 and a pipe 11.

FIGS. 10-14 illustrate another example, wherein a fluid channel 30 (indicated in FIGS. 12-14, but also visible in FIGS. 10 and 11) is arranged to allow pressurization of an interior volume of the plug 20 via the fluid channel 30. The fluid channel 30 for this purpose provides a fluid connection between the flow line 11' and the interior volume of the plug 20. Alternatively, the fluid channel 30 may provide a fluid connection from the opposite side of the plug 20 (the right-hand-side as viewed in FIGS. 10-14), if, for example, the plug 20 is to be shattered from a subsea structure 4, 14-17 side of the plug 20.

In the illustrated example, the plug comprises two parts 20a,b (see particularly FIG. 13), and the interior volume is the volume between the parts 20a,b. The two parts 20a,b are advantageously two glass discs, however may alternatively be of a different type.

The plug 20 may be held in place by a holder part 26, which in the illustrated example is fixed in the end connector 11a with the assistance of a lock ring 23. The fluid channel 30 may advantageously be provided through the holder part 26 which holds the plug 20.

Figure 13:
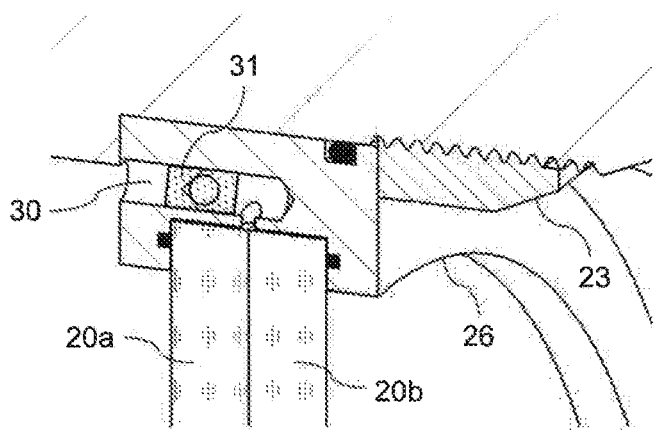
Figure 14:
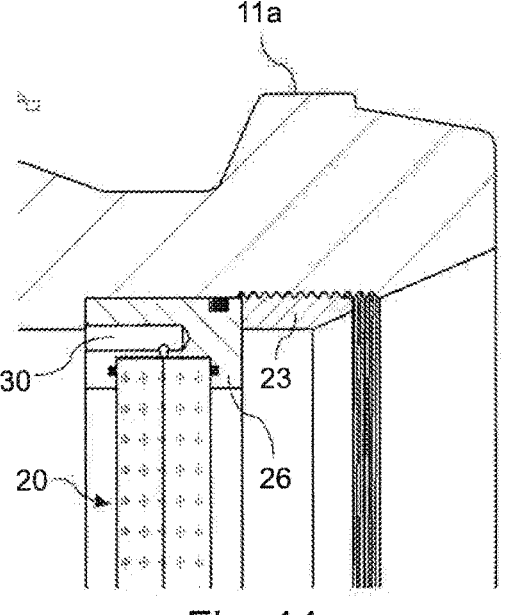

Illustrated in FIG. 13, the fluid channel 30 may further comprise a one-way valve 31. The one-way valve 31 can be configured with a pressure setting such as to require a threshold pressure before opening and providing fluid into/ pressurization of the interior volume of the plug 20, such as between the two parts 20a,b. Alternatively, the fluid channel 30 may comprise a rupture member, such as a rupture disc, a breakable plug or equivalent, which blocks the fluid channel 30 at low pressures and ruptures such as to open the fluid channel 30 if exposed to a pressure exceeding a threshold pressure.

In the example shown in FIGS. 10-14, a more secure shattering of the plug 20 may be achieved, for example in that a fluid pressure is selectively permitted to act onto the second part 20b to shatter this part first, whereupon the first part 20a is shattered. This can allow shattering of the plug 20 using lower pressures or less energy, since each individual part 20a,b can be designed with lower structural integrity than the complete plug 20. By using a one-way valve 31, the threshold pressure required for shattering may be selected to a suitable value, in order that the plug 20 remains intact during ordinary operations (e.g., an installation operation and the internal pressures in the pipe 11 expected during that operation), while being able to allow shattering of the plug 20 at a desired point in time by actively increasing the pressure in the pipe 11 to above the threshold.

FIGS. 15-18 illustrate an example wherein the connector 11a comprises a loading member 35 movably arranged in the connector 11a, and operable to effect a mechanical load onto the plug 20 such as to damage the plug 20. The loading member 35 may, for example, be a sleeve or a pin member arranged in the connector 11a.

Figure 15:
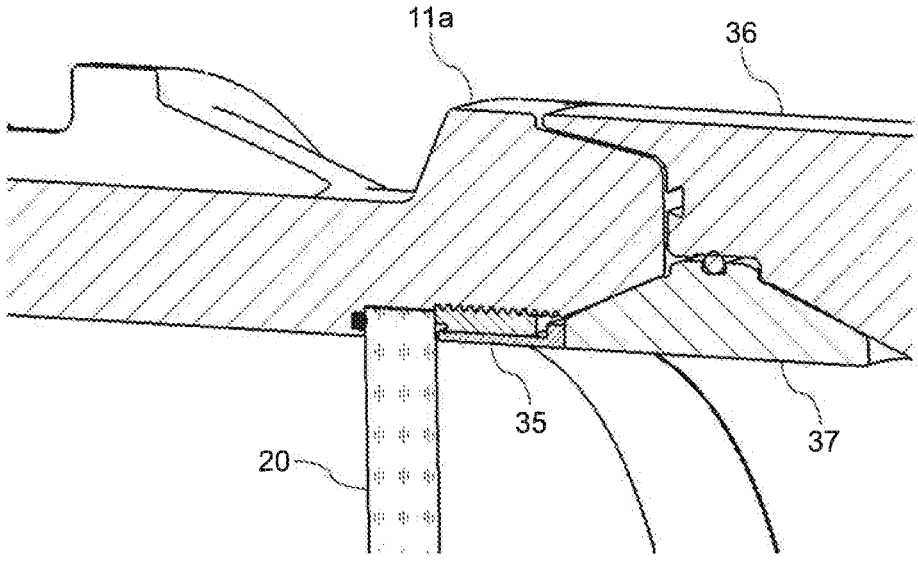
FIGS. 15-18 illustrate an example having a loading member operable to damage the plug.
Figure 16:
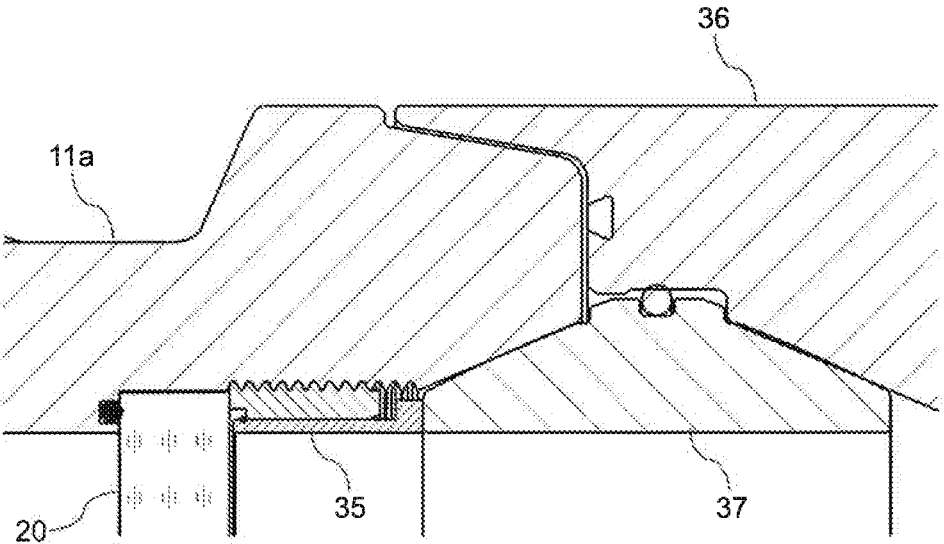
Figure 17:
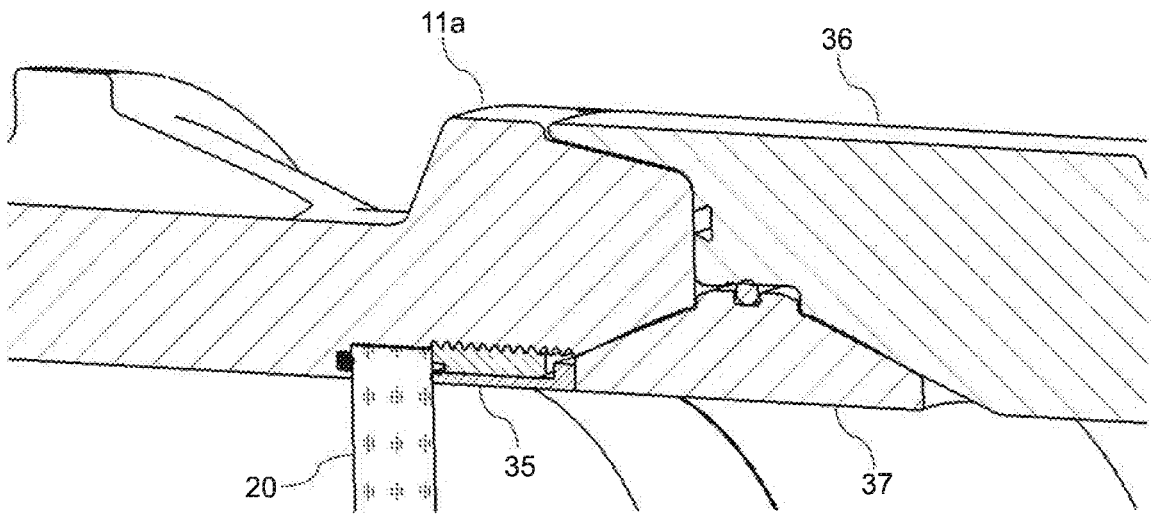
Figure 18:
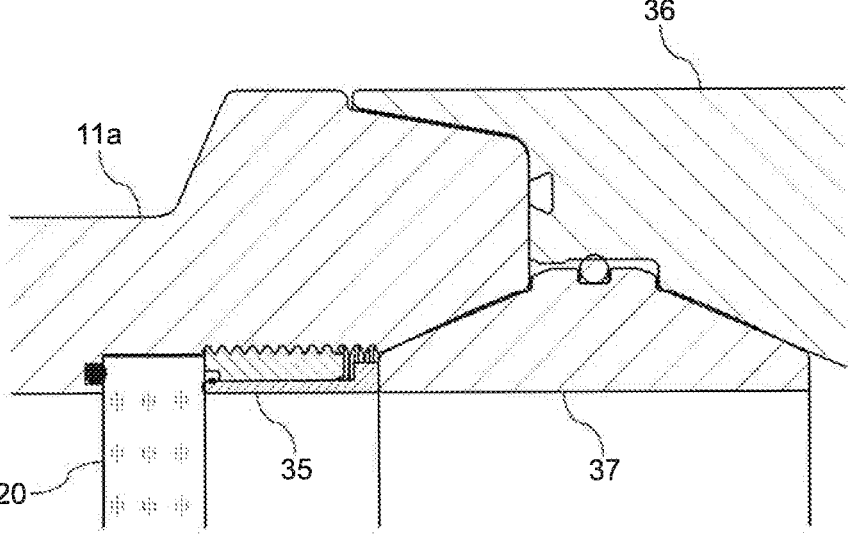

The loading member 35 in the shown example has an end face engaging a connector lock part 37, in this example a metallic seal. The connector lock part 37 in turn engages a second lock part 36, in this case a termination end fitting. When the connector 11a is not made up to a corresponding connector (e.g., connector 4a) of a subsea structure, there is no longitudinal force acting on the loading member 35. When the connector 11a is made up, for example by clamps or collets which are part of the connector assembly, the connector 11a will be pulled longitudinally into tight engagement with the corresponding connector 4a on the structure. This motion will then cause a longitudinal force onto the loading member 35 (in this example via the lock parts 36 (end fitting) and 37 (metallic seal)), which in turn moves towards and/or into the plug 20 so as to damage the plug 20 by mechanical loading. FIGS. 15 and 16 illustrate the non-loaded (unconnected) state, while FIGS. 17 and 18 illustrate a locking state, wherein the loading member 35 has been brought into loading engagement with the plug 20.

The damage caused by the loading member 35 may be so as to shatter the plug 20 directly, or may reduce the structural integrity of the plug 20 to such an extent that e.g. a fluid pressure force causes the shattering.

The loading member 35 may for this purpose be engaged by lock parts 36, 37 that are part of the connector 11a during installation, as illustrated, or it may alternatively be engaged by a part of the connector 4a of the structure, such as a pipe end of the connector 4a.

Alternatively, the loading member 35 may be arranged radially into the connector 11a (or into the pipe 11-13, if the plug 20 is arranged in the pipe 11-13). In such an example, the loading member 35 may be operated from outside the pipe 11-13 and connector 11a, for example by an ROV. The loading member 35 may, for example, be a pin or screw which is threaded in the housing of the connector 11a, such that it can be driven radially into the connector 11a and the plug 20 by engagement with the ROV.

The plug 20 in any of the examples described herein may be made of glass and/or another suitable brittle material such as a ceramic material or an amorphous non-crystalline solid. The plug 20 can be arranged to permit a shattering of the plug, i.e. a destruction of the plug 20 in such a way that the flow line 11' is substantially fully open after the plug 20 has been shattered. The shards can then be circulated out together with the transported fluids in the pipe 11, 12, 13. The plug 20 can be made of a single, unitary piece of material, or for example several layers or sections of material. A plug 20 may, for example, comprise two or more glass discs, optionally with a filler material or void therebetween.

Further inventive aspects and embodiments are outlined in the following numbered clauses.

C1. A method of installing a subsea pipe (11, 12, 13), the method comprising:

laying down a pipe (11, 12, 13) onto a sea floor (2) or onto a subsea structure (4, 14-17), the pipe (11, 12, 13) and/or the subsea structure (4, 14-17) having a breakable plug (20) sealingly arranged in an internal flow line (11') of the pipe (11, 12, 13) and/or the subsea structure (4, 14-17);

positioning an end connector (11a, 12a, 12b) of the pipe (11, 12, 13) adjacent a connector (4a) of a subsea structure (4, 14-17);

making up a connection between the end connector (11a, 12a, 12b) and the connector (4a) of the subsea structure (4, 14-17) while the breakable plug (20) is intact;

shattering the plug (20) such as to open for fluid connection between the pipe (11, 12, 13) and the subsea structure (4, 14-17).

C2. The method of any preceding clause, wherein the step of shattering the plug (20) comprises increasing a pressure at the breakable plug (20) so as to cause a shattering of the plug.

C3. The method of any preceding clause, wherein the step of increasing the pressure at the breakable plug (20) comprises:

increasing the pressure at a pipe (11) side of the plug (20), or increasing the pressure at a subsea structure (4, 14-17) side of the plug (20).

C4. The method of any preceding clause, further comprising the step:

subsequent to laying down the pipe (11, 12, 13) and prior to shattering the plug (20), pressure testing the pipe (11, 12, 13) by increasing an internal pressure in the pipe (11, 12, 13) with the breakable plug (20) intact therein.

C5. The method of any preceding clause, wherein the step of pressure testing the pipe (11, 12, 13) is carried out prior to making up the connection between the end connector (11a, 12a, 12b) and the connector (4a) of the subsea structure (4, 14-17).

C6. The method of any preceding clause, wherein the step of laying down the pipe (11, 12, 13) comprises:

arranging the pipe (11, 12, 13) between two subsea structures (4, 14-17), and/or arranging the pipe (11, 12, 13) on the sea floor (2).

C7. The method of any preceding clause, wherein the step of making up the connection comprises operating an actuator to pull the end connector (11a, 12a, 12b) into engagement with the connector (4a) of the subsea structure (4, 14-17).

C8. The method of any preceding clause, comprising laying down the pipe (11, 12, 13) with two breakable plugs (20) sealingly arranged in the internal flow line of the pipe (11, 12, 13).

C9. The method of any preceding clause, wherein the step of laying down the pipe (11, 12, 13) comprises laying down the pipe (11, 12, 13) on the sea floor (2) from a ship (3) and the pipe (11, 12, 13) is a flexible pipe (11, 12, 13).

C10. The method of any preceding clause, wherein the plug(s) (20) is/are arranged in the end connector(s) (11a, 12a, 12b), the end connector(s) (11a, 12a, 12b) forming strengthened end parts of the pipe (11, 12, 13).

C11. A method of establishing a fluid connection in a subsea petroleum production system, the method comprising:

positioning a first subsea fluid handling component (4, 11-17, 28) having a first connector (4a, 11a, 12a, 12b,29) adjacent a second subsea fluid handling component (4, 11-17, 28) having a second connector (4a, 11a, 12a, 12b,29), the first and/or second connectors (4a, 11a, 12a, 12b,29) having a breakable plug (20) sealingly arranged therein;

operating an actuator to make up a connection between the first and second connectors (4a, 11a, 12a, 12b,29) while the breakable plug (20) is intact;

shattering the plug (20) such as to open for fluid connection between the first and second subsea fluid handling components (4, 11-17, 28).

C12. The method of any preceding clause, wherein the step of shattering the plug (20) comprises increasing a pressure at the breakable plug (20) so as to cause a shattering of the plug.

C13. The method of any preceding clause, wherein the first subsea fluid handling component (4, 11-17, 28) is a pipe (11-13) and the step of increasing the pressure at the breakable plug (20) comprises increasing the pressure at a pipe (11-13) side of the plug (20).

C14. The method of any preceding clause, further comprising laying down the pipe (11, 12, 13) at a sea floor (2) or arranging the pipe (11, 12, 13) between two subsea structures (4, 14-17).

C15. The method of any preceding clause, further comprising the step: subsequent to laying down the pipe (11, 12, 13) at the sea floor (2) or arranging the pipe (11, 12, 13) between two subsea structures (4, 14-17) and prior to shattering the plug (20), pressure testing the pipe (11, 12, 13) by increasing an internal pressure in the pipe (11, 12, 13) with the breakable plug (20) intact therein.

C16. The method of any preceding clause, wherein the step of pressure testing the pipe (11, 12, 13) is carried out prior to operating the actuator to make up the connection between the first and second connectors (4a, 11a, 12a, 12b,29).

C17. The method of any preceding clause, wherein the step of laying down the pipe (11, 12, 13) comprises laying down the pipe (11, 12, 13) on the sea floor (2) from a ship (3) and the pipe (11, 12, 13) is a flexible pipe (11, 12, 13).

C18. The method of any preceding clause, wherein the first and second subsea fluid handling components (4, 11, 14-17,28) are subsea structures (4, 14-17,28).

C19. The method of any preceding clause, wherein the step of operating the actuator to make up the connection between the first and second connectors (4a, 11a, 12a, 12b,29) comprises operating the actuator to pull the first and second connectors (4a, 11a, 12a, 12b,29) into engagement.

C20. The method of any preceding clause, whereby a fluid channel (30) is provided into an interior volume in the plug (20), and the step of shattering the plug (20) comprises pressurising the interior volume in the plug (20) through the fluid channel (30).

C21. The method of any preceding clause, where the fluid channel (30) is provided through a holder part (26) which holds the plug (20).

C22. The method of any preceding clause, where the fluid channel (30) comprises a one-way valve (31) or a rupture member arranged therein.

C23. The method of any preceding clause, wherein the plug (20) comprises first and second parts (20a,b) and the interior volume is a volume between the first and second parts (20a,b).

C24. The method of any preceding clause, comprising bringing a loading member (35) which is movably arranged in the pipe (11, 12, 13), for example movably arranged in the connector (11*a*), into engagement with the plug (20) and effecting a load onto the plug (20) such as to damage the plug (20).

C25. The method of any preceding clause, wherein the load is effected onto the plug (20) by the loading member (35) as part of a locking operation which locks the connector (11*a*) to an external connector (4*a*).

C26. A subsea pipe (11, 12, 13) having a breakable plug (20) sealingly arranged therein.

C27. The subsea pipe (11, 12, 13) of any preceding clause, the subsea pipe (11, 12, 13) being configured for arrangement on a sea floor (2) or on a subsea structure (4, 14-17).

C28. The subsea pipe (11, 12, 13) of any preceding clause, further comprising an end connector (11*a*, 12*a*, 12*b*) forming strengthened end parts of the pipe (11, 12, 13), and wherein the breakable plug (20) is arranged in the end connector (11*a*, 12*a*, 12*b*).

C29. The subsea pipe (11, 12, 13) of any preceding clause, wherein the plug (20) is a glass plug.

C30. The subsea pipe (11, 12, 13) of any preceding clause, wherein the plug (20) is held in place in the subsea pipe (11, 12, 13) or in the end connector (11*a*) by
a lock ring (21,23), such as a segmented lock ring (21) or a continuous lock ring (23), or
a holder part (26).

C31. The subsea pipe (11, 12, 13) of any preceding clause, wherein the plug (20) comprises an angled or frustoconical portion (25) configured to cooperate with a corresponding face in the pipe (11) or in the end connector (11*a*, 12*a*, 12*b*) to shatter the plug (20) when a fluid pressure is applied on the plug (20).

C32. The subsea pipe (11, 12, 13) of any preceding clause, comprising a fluid channel (30) provided into an interior volume in the plug (20) by which the interior volume in the plug (20) can be pressurised through the fluid channel (30).

C33. The subsea pipe (11, 12, 13) of any preceding clause, wherein the fluid channel (30) is provided through a holder part (26) which holds the plug (20).

C34. The subsea pipe (11, 12, 13) of any preceding clause, where the fluid channel (30) comprises a one-way valve (31) or a rupture member arranged therein.

C35. The subsea pipe (11, 12, 13) of any preceding clause, wherein the plug (20) comprises first and second parts (20*a,b*) and the interior volume is a volume between the first and second parts (20*a,b*).

C36. The subsea pipe (11, 12, 13) of any preceding clause wherein the pipe (11, 12, 13), for example the connector (11*a*), comprises a loading member (35) movably arranged in the pipe (11, 12, 13), for example movably arranged in the connector (11*a*), and operable to effect a load onto the plug (20) such as to damage the plug (20).

C37. The subsea pipe (11, 12, 13) of any preceding clause, wherein the loading member (35) is movable, such as slidable, in a longitudinal direction of the pipe (11, 12, 13) and/or the connector (11*a*).

C38. The subsea pipe (11, 12, 13) of any preceding clause, wherein the loading member (35) abuts connector lock parts (36,37) and the connector lock parts (36,37) are configured to bring the loading member (35) into engagement with the plug (20) upon locking the connector (11*a*) to an external connector (4*a*).

The invention claimed is:

1. A method of establishing a fluid connection in a subsea petroleum production system, the method comprising:
   positioning a first subsea fluid handling component having a first connector adjacent a second subsea fluid handling component having a second connector, the first and/or second connectors having a breakable plug sealingly arranged therein, wherein the first subsea fluid handling component is a pipe;
   operating an actuator to make up a connection between the first and second connectors while the breakable plug is intact;
   bringing a loading member, which is movably arranged in the pipe into engagement with the breakable plug and effecting a load onto the breakable plug such as to damage the breakable plug, wherein the load is effected onto the breakable plug by the loading member as part of a locking operation which locks the first connector to the second connector; and
   shattering the breakable plug such as to open for fluid connection between the first and second subsea fluid handling components, wherein the step of shattering the breakable plug comprises increasing a pressure at a pipe side of the breakable plug so as to cause a shattering of the breakable plug.

2. The method of claim 1, further comprising laying down the pipe at a sea floor or arranging the pipe between two subsea structures.

3. The method of claim 2, further comprising:
   subsequent to laying down the pipe at the sea floor or arranging the pipe between two subsea structures and prior to shattering the breakable plug, pressure testing the pipe by increasing an internal pressure in the pipe with the breakable plug intact therein.

4. The method of claim 3, wherein the step of pressure testing the pipe is carried out prior to operating the actuator to make up the connection between the first and second connectors, wherein the step of laying down the pipe comprises laying down the pipe on the sea floor from a ship and the pipe is a flexible pipe.

5. The method of claim 1, wherein the step of operating the actuator to make up the connection between the first and second connectors comprises operating the actuator to pull the first and second connectors into engagement.

6. The method of claim 1, whereby a fluid channel is provided into an interior volume in the breakable plug, and the step of shattering the breakable plug comprises pressurising the interior volume in the breakable plug through the fluid channel.

7. The method of claim 6, wherein the fluid channel:
   (a) is provided through a holder part which holds the breakable plug; or
   (b) comprises a one-way valve or a rupture member arranged therein.

8. The method of claim 6, wherein the breakable plug comprises first and second parts and the interior volume is a volume between the first and second parts.

* * * * *